United States Patent  
Gao et al.

(10) Patent No.: US 12,225,193 B2  
(45) Date of Patent: Feb. 11, 2025

(54) INFORMATION COMPRESSION/DECOMPRESSION METHODS AND APPARATUSES, AND STORAGE MEDIUM

(71) Applicant: ZTE Corporation, Shenzhen (CN)

(72) Inventors: Junping Gao, Shenzhen (CN); Zhenfeng Cui, Shenzhen (CN); Zhen Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 528 days.

(21) Appl. No.: 17/608,370

(22) PCT Filed: Apr. 30, 2020

(86) PCT No.: PCT/CN2020/088434
§ 371 (c)(1),
(2) Date: Nov. 2, 2021

(87) PCT Pub. No.: WO2020/224551
PCT Pub. Date: Nov. 12, 2020

(65) Prior Publication Data
US 2022/0264091 A1 Aug. 18, 2022

(30) Foreign Application Priority Data
May 8, 2019 (CN) .......................... 201910383463.3

(51) Int. Cl.
*H04N 19/119* (2014.01)
*G06V 30/18* (2022.01)
(Continued)

(52) U.S. Cl.
CPC ..... *H04N 19/119* (2014.11); *G06V 30/18095* (2022.01); *G06V 30/413* (2022.01);
(Continued)

(58) Field of Classification Search
CPC .. H04N 19/119; H04N 19/129; H04N 19/136; H04N 19/167; H04N 19/174;
(Continued)

(56) References Cited

U.S. PATENT DOCUMENTS 10,257,520 B2 * 4/2019 He .................. H04N 19/176
2008/0101698 A1 5/2008 Yago
(Continued)

FOREIGN PATENT DOCUMENTS

CN 102136064 A 7/2011
CN 102542279 A 7/2012
(Continued)

OTHER PUBLICATIONS

A. Said and A. Drukarev, "Simplified segmentation for compound image compression," Proceedings 1999 International Conference on Image Processing (Cat. 99CH36348), Kobe, Japan, 1999, pp. 229-233 vol. 1, doi: 10.1109/ICIP.1999.821603. (Year: 1999).*

(Continued)

*Primary Examiner* — William C Vaughn, Jr.
*Assistant Examiner* — Astewaye Gettu Zewede
(74) *Attorney, Agent, or Firm* — Vivacqua Crane, PLLC

(57) ABSTRACT

A method for information compression/decompression, apparatuses and a non-transitory computer-readable storage medium are disclosed. The method for information compression may include: clustering text blocks to be processed into respective-text areas according to pixel distribution information of the text blocks to be processed; acquiring text row distribution information of each of the text areas according to foreground pixels of each text row in each of the text areas; scanning each text row in each of the text areas according to the acquired text row distribution information to acquire original pixel information of each text row; and performing lossless compression on the text row distribution (Continued)

information of a plurality of the text areas and the original pixel information of each text row of the plurality of the text areas.

14 Claims, 2 Drawing Sheets

(51) Int. Cl.
    *G06V 30/413*     (2022.01)
    *H04N 19/129*     (2014.01)
    *H04N 19/136*     (2014.01)
    *H04N 19/167*     (2014.01)
    *H04N 19/174*     (2014.01)
    *H04N 19/176*     (2014.01)
    *H04N 19/182*     (2014.01)
    *H04N 19/70*     (2014.01)
    *H04N 19/85*     (2014.01)

(52) U.S. Cl.
    CPC ......... *H04N 19/129* (2014.11); *H04N 19/136* (2014.11); *H04N 19/167* (2014.11); *H04N 19/174* (2014.11); *H04N 19/176* (2014.11); *H04N 19/182* (2014.11); *H04N 19/70* (2014.11); *H04N 19/85* (2014.11)

(58) Field of Classification Search
    CPC .... H04N 19/176; H04N 19/182; H04N 19/70; H04N 19/85; H04N 19/14; H04N 19/27; H04N 19/04; H04N 19/154; G06V 30/18095; G06V 30/413
    USPC ........................................................ 375/240
    See application file for complete search history.

(56) References Cited

U.S. PATENT DOCUMENTS

| | | | |
|---|---|---|---|
| 2008/0123945 A1 | 5/2008 | Andrew et al. | |
| 2009/0046937 A1 | 2/2009 | Fenney et al. | |
| 2009/0208125 A1* | 8/2009 | Kajiwara | H04N 1/41 382/243 |
| 2010/0158400 A1* | 6/2010 | Lu | H04N 19/176 382/238 |
| 2011/0001994 A1* | 1/2011 | Matsuda | H04N 19/17 358/1.9 |
| 2013/0343448 A1 | 12/2013 | He et al. | |
| 2016/0026899 A1 | 1/2016 | Wang et al. | |
| 2019/0089849 A1* | 3/2019 | Yamazaki | H04N 1/00331 |
| 2020/0186813 A1* | 6/2020 | Fishwick | H04N 19/12 |

FOREIGN PATENT DOCUMENTS

| | | | | |
|---|---|---|---|---|
| CN | 108205676 A | | 6/2018 | |
| GB | 2525208 A | * | 10/2015 | ............ H04N 19/40 |
| JP | 2003208567 A | | 7/2003 | |
| JP | 2006197178 A | | 7/2006 | |

OTHER PUBLICATIONS

International Searching Authority. International Search Report and Written Opinion for PCT Application No. PCT/CN2020/088434 and English translation, mailed Jul. 29, 2020, 10 pages.

European Patent Office. Extended European Search Report for EP Application No. 20801877.0, mailed May 23, 2022, pp. 1-14.

Said, et al. "Simplified Segmentation for Compound Image Compression," IEEE International Conference on Image Processing, 1999, p. 229-233.

The State Intellectual Property Office of People's Republic of China. First Office Action for CN Application No. 201910383463.3 and English translation, mailed Jul. 22, 2024, pp. 1-16.

The State Intellectual Property Office of People's Republic of China. First Search Report for CN Application No. 201910383463.3 and English translation, mailed Jul. 19, 2024, pp. 1-5.

* cited by examiner

INFORMATION COMPRESSION/DECOMPRESSION METHODS AND APPARATUSES, AND STORAGE MEDIUM

CROSS-REFERENCE TO RELATED APPLICATION

This application is a national stage filing under 35 U.S.C. § 371 of international application number PCT/CN2020/088434, filed Apr. 30, 2020, which claims priority to Chinese patent application No. 201910383463.3 filed on May 8, 2019. The contents of these applications are incorporated herein by reference in their entirety.

TECHNICAL FIELD

The present disclosure relates to but is not limited to information processing technology, such as a method for information compression/decompression, apparatus and non-transitory computer-readable storage medium.

BACKGROUND

With the popularization of cloud computing, virtual desktop and other technologies, it is necessary to transmit a large amount of remote data to user terminals as quickly and clearly as possible for display through the network. In the daily office scenes of cloud desktop, the screen content usually contains a large number of words, and the clarity of the words can significantly affect the comfort of human vision. Therefore, in the usual cloud desktop scenes, the words are processed by lossless or near lossless compression algorithms.

In the existing technology, for text compression, a dominant method is to compress the palette index value corresponding to each pixel after clustering text areas to generate a palette based on the limited distribution of pixel values in the text areas, that is, compression based on the palette and the index value; another dominant method is to transform the original pixels in text areas into frequency domain and transmit the transformed coefficients.

In the existing technology, the method for compressing text information uses lossless or lossy compression algorithm in spatial or frequency domain to compress text areas as a whole after distinguishing and identifying the text areas, so that the compression efficiency of the text is not optimized.

SUMMARY

The present disclosure provides a method for information compression/decompression, an apparatus and a non-transitory computer-readable storage medium, which can improve, to at least a certain extent, the compression efficiency on text information and improve the clarity of text information after transmission.

The present disclosure provides a method for information compression,
which may include: clustering text blocks to be processed into respective text areas according to pixel distribution information of the text blocks to be processed; acquiring text row distribution information of each of the text areas according to foreground pixels of each text row in each of the text areas; scanning each text row in each of the text areas according to the acquired text row distribution information to acquire original pixel information of each text row; and performing lossless compression on the text row distribution information of a plurality of the text areas and the original pixel information of each text row of the plurality of the text areas.

The present disclosure also provides a non-transitory computer-readable storage medium storing computer-executable instructions which, when executed by a processor, causes the processor to perform the method for information compression according to any one of embodiments of the present disclosure.

The present disclosure also provides an apparatus for information compression, which may include: a processor and a memory; where the memory is configured to store a computer program executable by the processor; the processor is configured to execute the computer program to perform the method for information compression according to any one of embodiments of the present disclosure.

The present disclosure also provides an apparatus for information compression,
which may include: a clustering module configured to cluster text blocks to be processed into respective text areas according to pixel distribution information of the text blocks to be processed; a splitting module configured to acquire text row distribution information of each of the text areas according to foreground pixels of each text row in each of the text areas; a scanning module configured to scan each text row in each of the text areas according to the acquired text row distribution information to acquire original pixel information of each text row; and a compression module configured to performing lossless compression on the text row distribution information of a plurality of the text areas and the original pixel information of each text row of the plurality of the text areas to acquire a lossless data packet.

The present disclosure also provides a method for information decompression,
which may include: parsing a received lossless data packet to acquire text row distribution information of at least one text area and original pixel information of each text row of each of the at least one text area; and in response to a determination of existence of a valid text row in at least one text area according to the acquired text row distribution information, performing text row pixel filling on the acquired original pixel information of each text row according to the text row distribution information to acquire text blocks to be processed.

The present disclosure also provides a non-transitory computer-readable storage medium storing computer-executable instructions which, when executed by a processor, causes the processor to perform the method for information decompression according to any one of embodiments of the present disclosure.

The present disclosure also provides an apparatus for information decompression, which may include: a processor and a memory; where the memory is configured to store a computer program executable by the processor; the processor is configured to execute the computer program to perform the method for information decompression according to any one of embodiments of the present disclosure.

The present disclosure also provides an apparatus for information decompression,
which may include: a parsing module configured to parse a received lossless data packet to acquire text row distribution information of at least one text area and original pixel information of each text row of each of the at least one text area; and a restoring module configured to, in response to a determination of existence of a valid text row in at least one text area according to the acquired text row distribution information, performing text row pixel filling on the acquired original pixel information of each text row according to the text row distribution information, to acquire text blocks to be processed.

BRIEF DESCRIPTION OF DRAWINGS

The attached drawings are provided as reference to understand the technical scheme of the present disclosure and constitute a part of the specification. The attached drawings are used to explain the technical scheme of the present disclosure together with the embodiments of the present disclosure, and do not constitute a restriction on the technical scheme of the present disclosure.

DETAILED DESCRIPTION

In a configuration according to the present disclosure, a computing device includes one or more central processing unit (CPU), an input/output interface, a network interface, and a memory.

The memory may include non-permanent memory in form of computer-readable media, random access memory (RAM), and/or nonvolatile memory such as read-only memory (ROM) or flash memory. The memory is an example of a computer-readable medium.

Computer-readable media include permanent and non-permanent, removable and non-removable media which can store information by any method or technology. Information can be computer-readable instructions, data structures, modules of programs, or other data. Examples of computer storage media include, but are not limited to, phase-change random access memory (PRAM), static random access memory (SRAM), dynamic random access memory (DRAM), other types of RAM, ROM, electrically erasable programmable read-only memory (EEPROM), flash memory or other memory technologies, compact disc read-only memory (CD-ROM), digital versatile disc (DVD) or other optical storage, magnetic cassette tape, magnetic tape and disk storage or other magnetic storage devices or any other non-transmission medium which can be used to store information that can be accessed by computing devices. As defined herein, the computer-readable media does not include transitory media, such as modulated data signals and carrier waves.

Hereinafter, embodiments of the present disclosure will be described with reference to the accompanying drawings.

Figure 1:
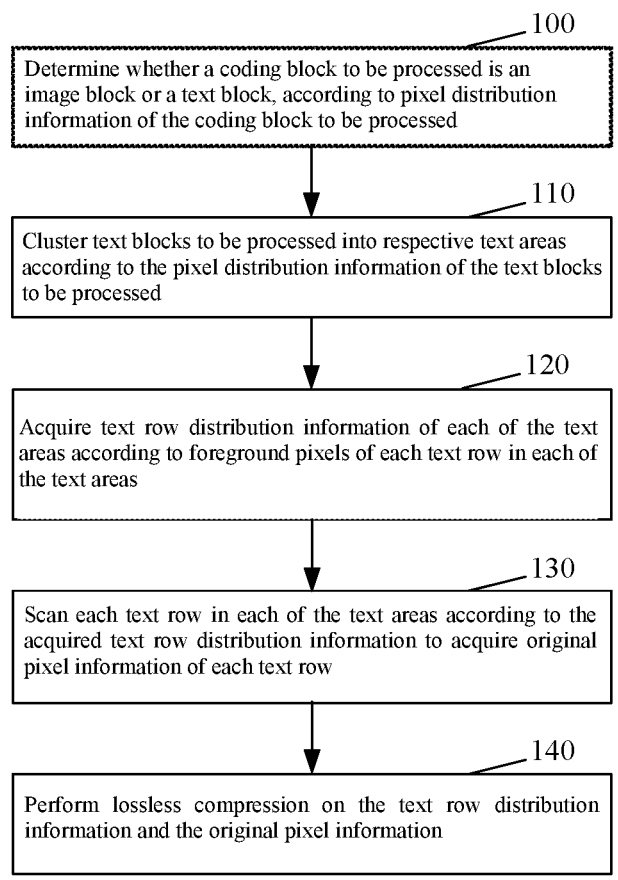
FIG. 1 is a schematic flow chart of a method for information compression according to the present disclosure.

Brief description of the drawings FIG. 1 is a schematic flow chart of a method for text information compression according to the present disclosure. As shown in FIG. 1, the method includes step 110: clustering text blocks to be processed into respective text areas according to pixel distribution information of the text blocks to be processed.

The text blocks each with a size of a coding unit are clustered into respective text areas, according to a value of top2 pixels, where the top2 pixels are two types of pixels with a first and second largest proportion of pixels in a single text block.

In an example embodiment, for two types of pixels, such as a first pixel (Y1, U1, V1) and a second pixel (Y2, U2, V2), a determination of whether the two pixels are similar includes:

setting a first threshold T1 and a second threshold a1 for judging a degree of approximation of the two pixels;

if $|Y1-Y2|<=a1$ and $|U1-U2|<=a1$ and $|V1-V2|<=a1$, it is determined that the difference between the first pixel and the second pixel is less or equal to T1, so the first pixel and the second pixel are approximate pixels; if $|y1-y2|>a1$ or $|u2-U2|>a1$ or $|v1-v2|>a1$, it is determined that the difference between the first pixel and the second pixel is greater than T1, then the first pixel and the second pixel are non-approximate pixels.

In the following, an example will be given to illustrate whether to cluster text blocks according to the similarity of pixels.

For example, for the initial state of text blocks clustering, in which there is no clustered text area at present: if the difference between each background pixel of the first text block and the top2 pixels of the second text block to be clustered is greater than T1, these two text blocks will belong to two independent text areas; if the difference between each background pixel of the first text block and one of top2 pixels of the second text block is not greater than T1, then the two text blocks are clustered into the same text area, where the values of the background pixels of the clustered text area are the values of the background pixels of the first text block.

For another example, with the clustering of text blocks, there are multiple clustered text areas. If the difference between top2 pixels of a text block to be clustered and each background pixel of a respective text area is $<=T1$, the text block will be clustered into this text area. If the difference between top2 pixels of a text block to be clustered and each background pixel of all existing text areas is greater than T1, then the text block does not belong to any existing text area, and a new text area needs to be added. The values of the background pixels of the newly added text area are the values of the background pixels of the text block.

This step is executed cyclically. In this cyclic execution process, the text blocks to be processed are clustered into corresponding text areas according to the value of the most important top2 pixels in the text blocks, which provides a precondition that the text blocks can be split into text rows for the subsequent row feature analysis of the text areas, ensuring that the text information can be compressed by using the distribution characteristics of the text in the subsequent processing, thus improving the compression efficiency of the text information and improving the clarity of the text information after transmission.

In an example embodiment, before the step 110, the method further includes a step 100: determining whether a coding block to be processed is an image block or a text block, according to pixel distribution information of the coding block to be processed.

In an example embodiment, the step 100 includes distinguishing a coding block to be processed as an image block or a text block according to gradient characteristics and color distribution information of distribution of pixels inside a coding block to be processed.

In an example embodiment, according to a need of an encoder, macroblocks can be divided according to the coding unit sizes of 16×16, 32×32, 64×64, etc. Then, the gradient characteristics of the distribution of pixels in each macroblock are analyzed (i.e., the gradient values are calculated) to divide the macroblocks into image blocks and text blocks. In an embodiment, the color information of pixels in the divided text blocks, such as the color types of pixels and the values of top2 pixels, are analyzed, and text blocks that meet a requirement (for example, setting a threshold value of pixel types in a text block as A1, and setting a difference between top2 pixels as T2, if the color types of pixels in the text block is <A1 and the difference between top2 pixels in the text block is >T2, it can be finally judged as a text block) are screened and selected.

The distribution of pixels in an image is gradual, and a gradient of pixel change is small; while there are many internal boundaries of characters, and a gradient of pixel change is large. Therefore, if a gradient threshold T3 is set in advance, the macroblocks with gradient value>T3 are determined as text blocks, and the rest macroblocks are determined as image blocks.

In an example embodiment, before step 100, the method further includes: performing color space conversion on pixels of a changed area in original screen data, that is, performing color space conversion from RGB color space to YUV color space such as YUV4:4:4 color space; dividing the blocks according to a size of a coding unit to acquire the coding blocks to be processed.

YUV is a pixel format in which luminance and chrominance parameters are expressed separately, where Y represents Luminance (Luma), U and V represent Chrominance (Chroma).

YUV4:4:4 sampling means that the sampling ratio of luminance component y, chrominance component u and chrominance component v is the same. Therefore, in a generated image, the information of the three components of each pixel is complete, which is 8 bits, that is, one byte.

In an example embodiment, a changed area in the original screen data includes a changed area of a virtual desktop that needs to be transmitted.

For example, the changed area in the original screen data can be an area where a next frame data changes compared with a previous frame data.

The method also includes a step 120 of acquiring text row distribution information of each of the text areas according to foreground pixels of each text row in each of the text areas.

In an example embodiment, step 120 includes: acquiring a pixel histogram containing each text row of each of the text areas by a horizontal histogram projection method; acquiring a distribution extremum of foreground pixels on the pixel histogram by a local extremum method; extracting row coordinate information of each text row according to the acquired distribution extremum, including a start coordinate and an end coordinate of a text row; and recording a number of text rows contained in each of the text areas, after all text rows in each of the text areas are processed. The text row distribution information of each of the text areas includes the number of text rows and the row coordinate information of each of the text areas.

In the present disclosure, the text row distribution information corresponding to each of the text areas includes, but is not limited to, the number of text rows and the row coordinate information of each text row, in each of the text areas.

The local extremum method can resist the interference of the table frame and accurately identify the true distribution coordinates of the text rows. The row coordinate information of the text rows acquired in this embodiment will be used as an input source of a subsequent lossless compression.

In this embodiment, the implementation of horizontal histogram projection method and local extremum method can refer to related technologies, however, the protection scope of the present disclosure should not be limited by these implementations. According to the present disclosure, before compressing and transmitting the text block, respective text areas in the text block and text rows in the text area are analyzed and then split according to the background information and foreground information, which ensures that the text information can be compressed by using the distribution characteristics of the text in the subsequent processing, thus improving the compression efficiency of the text information and improving the clarity of the text information after transmission.

In this embodiment, for each text area after clustering, the horizontal histogram projection inside the area is performed, that is, the foreground pixels on each row of the text area are summarized, and the starting position of the row is identified by the local extremum method according to the summarized value. Through this step, the text area is split into text rows.

The method also includes a step 130 of scanning each text row in each of the text areas according to the acquired text row distribution information to acquire original pixel information of each text row.

In an example embodiment, step 130 includes performing vertical column scanning on a text row in a text area according to the row coordinate information and based on the acquired text row distribution information to acquire the original pixel information of the text row.

For example, from the start coordinate of the row to the end coordinate of the row, the text row is scanned in a vertical column scanning mode from left to right to acquire the original pixel information corresponding to the text row.

For another example, from the end coordinate of the row to the start coordinate of the row, the text row is scanned in a vertical column scanning mode from right to left to acquire the original pixel information corresponding to the text row.

In this embodiment, as long as the vertical column scanning of each row meets the requirements of compression and decompression, the corresponding methods can be adopted.

In this embodiment, the acquired original pixel information of the text row will be used as the input source for subsequent lossless compression.

The method also includes a step 140 of performing lossless compression on the text row distribution information and the original pixel information.

In an embodiment, the row coordinate information of the text row and the original pixel information of the text row are used as input sources for lossless compression to acquire lossless data packets.

The lossless data packets acquired after lossless compression processing in this embodiment is the compression result of the text blocks to be processed.

Lossless compression in this embodiment can be implemented by adopting related technologies, and will not be described here again. The protection scope of the present disclosure should not be limited by these implementations.

In an example embodiment, if the coding blocks to be processed include image blocks and text blocks, the method according to the present disclosure further includes: compressing the image blocks, such as by lossy compression, to acquire a lossy data packet; packing the lossless data packet and lossy data packet for transmission. In this situation, the method also includes distinguishing the lossless data packet from the lossy data packet, such as by setting different identifiers.

In an example embodiment, if the coding blocks to be processed include image blocks and text blocks, for the processing to the image blocks, the method according to the present disclosure further includes: determining types of coding blocks respectively adjacent to left, upper left and upper of an image block; and classifying the type of the image block as a text block in response to that the types of the coding blocks adjacent to the left, the upper left and the upper of the image block are all text blocks. Through such processing, the whole text area can be prevented from being split into irregular small areas, the integrity of the text area is fully guaranteed, and the accuracy of subsequent text row splitting is improved.

With the method for information compression according to the present disclosure, the compression efficiency of texts is improved, and at the same time, the clarity of texts after information transmission is improved.

An embodiment of the present disclosure also provides a non-transitory computer-readable storage medium storing computer-executable instructions configured to cause the method for information compression described in any one of the embodiments of the present disclosure to be executed.

An embodiment of the disclosure also provides an apparatus for information compression, including: a processor and a memory; where the memory is configured to store a computer program executable by the processor; the processor is configured to execute the method for information compression described in any one of the embodiments of the present disclosure.

Figure 2:
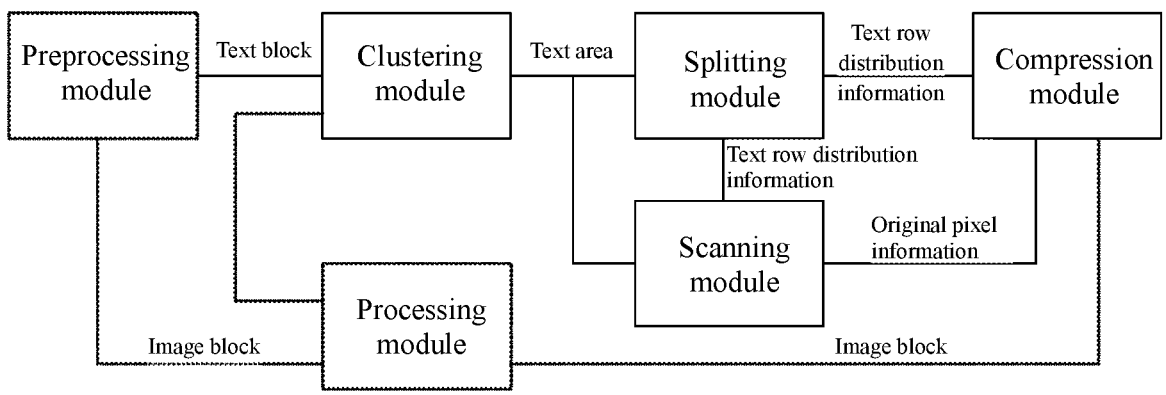
FIG. 2 is a schematic structural diagram of an apparatus for information compression according to the present disclosure.

FIG. 2 is a schematic structural diagram of an apparatus for information compression according to the present disclosure. As shown in FIG. 2, the apparatus at least include: a clustering module configured to cluster text blocks to be processed into respective text areas according to pixel distribution information of the text blocks to be processed; a splitting module configured to acquire text row distribution information of each of the text areas according to foreground pixels of each text row in each of the text areas; a scanning module configured to scan each text row in each of the text areas according to the acquired text row distribution information to acquire original pixel information of each text row; a compression module configured to performing lossless compression on the text row distribution information of a plurality of the text areas and the original pixel information of each text row of the plurality of the text areas to acquire a lossless data packet.

The apparatus for information compression according to the present disclosure also includes a preprocessing module configured to determine whether a coding block to be processed is an image block or a text block, according to pixel distribution information of the coding block to be processed.

In an example embodiment, the compression module is also configured to, in response to a determination that a plurality of the coding blocks to be processed include image blocks and text blocks, perform lossy compression on the image blocks to acquire a lossy data packet; and package and transmit a lossless data packet and the lossy data packet.

In an example embodiment, the apparatus according to the present disclosure also includes a processing module configured to, in response to a determination that a plurality of the coding blocks to be processed include image blocks and text blocks, before the operation of clustering the text blocks to be processed into respective text areas, determine types of coding blocks respectively adjacent to left, upper left and upper of an image block; and classify the type of the image block as a text block in response to that the types of the coding blocks respectively adjacent to the left, the upper left and the upper of the image block are all text blocks.

Figure 3:
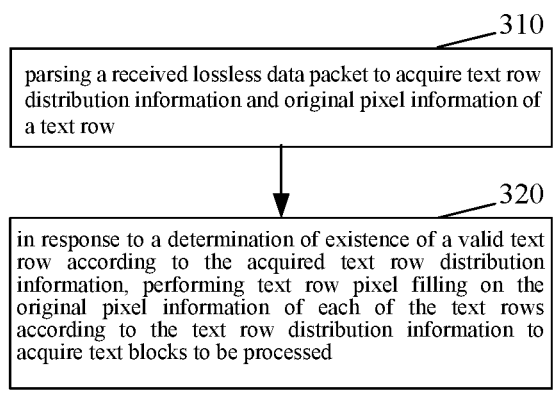
FIG. 3 is a schematic flow chart of a method for information decompression according to the present disclosure.

FIG. 3 is a schematic flow chart of the method for information decompression according to the present disclosure, as shown in FIG. 3, which includes the following steps.

Step 310: parsing a received lossless data packet to acquire text row distribution information of at least one text area and original pixel information of each text row of each of the at least one text area.

In an example embodiment, the lossless data packet can be decoded in a lossless decoding manner to acquire the text row distribution information, the original pixel information of a text row, etc.

The text row distribution information corresponds to each text area, including but not limited to the number of text rows included in the text area, and the row coordinate information of each row in the text area (including the start coordinate and the end coordinate).

Step 320: in response to a determination of existence of a valid text row in at least one text area according to the acquired text row distribution information, performing text row pixel filling on the acquired original pixel information of each text row according to the text row distribution information to acquire text blocks to be processed.

In an example embodiment, the step of determining whether a valid text row exists includes: in response to the text row distribution information showing that a number of text rows in at least one text area is greater than 0, determining that at least one valid text row exists in the current frame, that is, in the currently received data packet.

In an example embodiment, if there is no split text row, that is to say, if there is no valid text row, then the entire text area can be directly filled with the decoded data.

In an example embodiment, before performing the step 310, the method also include: parsing a currently received data packet to determine whether the currently received data packet is a lossless data packet of lossless compression type or a lossy data packet of lossy compression type; in response to a determination that the currently received data packet is a lossless data packet of lossless compression type, performing the step 310; and in response to a determination that the currently received data packet is a lossy data packet of lossy compression type, decoding the lossy data packet.

In an example embodiment, after performing the step 320, the method also include: placing decoded data into a data frame, where the decoded data includes lossless decoded data, or lossless decoded data and lossy decoded data; and performing color space conversion on pixels in the data frame according to a color space required for a final display, where a YUV color space is converted to a color space required for display.

In an example embodiment, when the changed area of the virtual desktop needs to be transmitted, the screen pixels of the cloud desktop are restored according to the text blocks for respective areas by the method shown in FIG. 3, and the transmission processing of the text information by using the distribution characteristics of the text is realized, thereby improving the compression efficiency of the text and improving the clarity of the text information after transmission.

An embodiment of the present disclosure also provides a non-transitory computer-readable storage medium storing computer-executable instructions configured to cause the method for information decompression described in any one of the embodiments of the present disclosure to be executed.

An embodiment of the disclosure also provides an apparatus for information compression, including: a processor and a memory; where the memory is configured to store a computer program executable by the processor; the processor is configured to execute the method for information decompression described in any one of the embodiments of the present disclosure.

Figure 4:
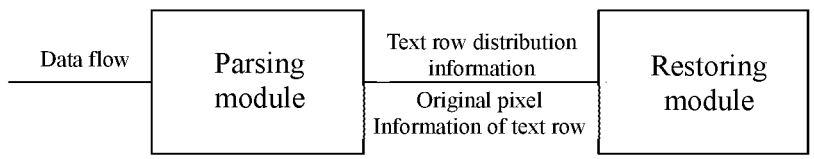
FIG. 4 is a schematic structural diagram of an apparatus for information decompression according to the present disclosure.

FIG. 4 is a schematic structural diagram of the apparatus for information decompression of the present disclosure. As shown in FIG. 4, the apparatus at least includes: a parsing module configured to parse a received lossless data packet to acquire text row distribution information of at least one text area and original pixel information of each text row of each of the at least one text area; and a restoring module configured to, in response to a determination of existence of a valid text row, performing text row pixel filling on the acquired original pixel information of each text row according to the text row distribution information, to acquire text blocks to be processed.

In an example embodiment, the restoring module is configured to determine that a valid text row exists by, in response to the text row distribution information showing that a number of text rows in at least one text area is greater than 0, determining that at least one valid text row exists in the current frame, that is, in the currently received data packet.

In an example embodiment, the parsing module is also configured to parse a currently received data packet to determine whether the currently received data packet is a lossless data packet of lossless compression type or a lossy data packet of lossy compression type; in response to a determination that the currently received data packet is a lossless data packet of lossless compression type, perform subsequent parsing on the lossless data packet to acquire text row distribution information; and in response to a determination that the currently received data packet is a lossy data packet of lossy compression type, decode the lossy data packet. Accordingly, the restoring module is also configured to: place decoded data into a data frame, where the decoded data includes lossless decoded data, or lossless decoded data and lossy decoded data; and perform color space conversion on pixels in the data frame according to a color space required for a final display, where a YUV color space is converted to a color space required for display.

The invention claimed is:

1. A method for information compression, comprising:
   clustering text blocks with a size of a coding unit to be processed into respective text areas according to a value of top2 pixels of the text blocks to be processed;
   splitting each of the text areas into at least one separate text row to acquire text row distribution information in each of the text areas according to foreground pixels distribution in each of the text areas;
   vertically scanning each text row in each of the text areas with respect to a direction of the text row according to the acquired text row distribution information to acquire original coded information of each text row; and
   performing lossless compression on the text row distribution information of a plurality of the text areas and the original pixel information of each text row of the plurality of the text areas;
   wherein, the text row consists of a plurality of pixel rows; and
   wherein, the top2 pixels are two types of pixels with a first and second largest proportion of pixels in a single text block.

2. The method for information compression according to claim 1, further comprising:
   dividing the changed area in the original screen data into blocks according to a size of a coding unit;
   determining whether a coding block to be processed is an image block or a text block, according to pixel distribution information of the coding block to be processed.

3. The method for information compression according to claim 1, wherein splitting each of the text areas into at least one separate text row to acquire text row distribution information in each of the text areas according to foreground pixels distribution in each of the text areas comprises:
   acquiring a pixel histogram containing each text row of each of the text areas by a horizontal histogram projection method;
   acquiring a distribution extremum of foreground pixels on the pixel histogram by a local extremum method;
   extracting row coordinate information of each text row according to the acquired distribution extremum; and
   recording a number of text rows contained in each of the text areas, under a condition of acquiring the row coordinate information of each text row in each of the text areas;
   wherein the text row distribution information of each of the text areas comprises the number of text rows contained in each of the text areas and the row coordinate information of each text row in each of the text areas.

4. The method for information compression according to claim 1, wherein vertically scanning each text row in each of the text areas with respect to a direction of the text row according to the acquired text row distribution information to acquire original coded information of each text row comprises:
   performing vertical column scanning on each text row according to the row coordinate information of each text row in the text row distribution information of each of the text areas to acquire the original pixel information of each text row.

5. The method for information compression according to claim 2, in response to a determination that a plurality of the coding blocks to be processed include image blocks and text blocks, further comprising:
   packaging and transmitting a lossless data packet and other data packet, wherein the lossless data packet is acquired by performing lossless compression on the text row distribution information of a plurality of the text areas and the original pixel information of each text row of the plurality of the text areas.

6. The method for information compression according to claim 2, in response to a determination that a plurality of the coding blocks to be processed include image blocks and text blocks, before clustering the text blocks to be processed into respective text areas, further comprising:
   determining a type of a coding block adjacent to left, a type of a coding block adjacent to upper left, a type of coding block adjacent to upper, respectively, of an image block; and
   classifying the type of the image block as a text block in response to that the types of the coding blocks respectively adjacent to the left, the upper left and the upper of the image block are all text blocks.

7. A non-transitory computer-readable storage medium storing computer-executable instructions configured to execute the method for information compression according to claim 1.

8. An apparatus for information compression, comprising: a processor and a memory; wherein the memory is configured to store a computer program executable by the processor; the processor is configured to execute a method for information compression according to claim 1.

9. A method for information decompression, comprising:
   parsing a received lossless data packet obtained by method for information compression according to claim 1 to acquire text row distribution information of at least one text area and original pixel information of each text row of each of the at least one text area; and
   in response to a determination of existence of a valid text row in at least one text area according to the acquired text row distribution information, performing text row pixel filling on the acquired original pixel information of each text row according to the text row distribution information, to acquire text blocks to be processed.

10. The method for information decompression according to claim 9, further comprising:
    parsing a currently received data packet to determine whether the currently received data packet is a lossless data packet of lossless compression type;
    in response to a determination that the currently received data packet is a lossless data packet of lossless compression type, performing subsequent parsing on the lossless data packet.

11. The method for information decompression according to claim 10, further comprising:
    placing decoded data into a data frame, wherein the decoded data comprises lossless decoded data, or lossless decoded data and other decoded data.

12. The method for information decompression according to claim 9, wherein determining that a valid text row exists in at least one text area according to the acquired text row distribution information comprises:
    in response to the text row distribution information showing that a number of text rows in at least one text area is greater than 0, determining that a valid text row exists in the text area with the number of text rows greater than 0.

13. A non-transitory computer-readable storage medium storing computer-executable instructions configured to execute the method for information decompression according to claim 9.

14. An apparatus for information decompression, comprising: a processor and a memory; wherein the memory is configured to store a computer program executable by the processor; the processor is configured to execute the method for information decompression according to claim 9.

* * * * *